United States Patent
Pinkal

(10) Patent No.: US 9,446,849 B1
(45) Date of Patent: Sep. 20, 2016

(54) STOWABLE RECLINING SEAT WITH LATERAL TRANSLATION LINKAGE

(71) Applicant: AMI Industries, Inc., Colorado Springs, CO (US)

(72) Inventor: Donald Pinkal, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 14/671,853

(22) Filed: Mar. 27, 2015

(51) Int. Cl.
*A47C 4/52* (2006.01)
*B64D 11/06* (2006.01)

(52) U.S. Cl.
CPC ......... *B64D 11/064* (2014.12); *B64D 11/0605* (2014.12); *B64D 11/0627* (2014.12); *B64D 11/0639* (2014.12); *B64D 11/0643* (2014.12); *B64D 11/0646* (2014.12)

(58) Field of Classification Search
CPC .......... A47C 1/126; A47C 4/00; A47C 4/52; A47C 9/06; B64D 11/064; B64D 11/0605; B64D 11/0627; B64D 11/0639; B64D 11/0643; B64D 11/0646
See application file for complete search history.

(56) References Cited

U.S. PATENT DOCUMENTS

| 1,321,009 | A | * | 11/1919 | Carlson | A47C 1/126 297/14 |
|---|---|---|---|---|---|
| 1,464,352 | A | * | 8/1923 | Cox | A47B 5/04 297/14 |
| 2,497,412 | A | * | 2/1950 | Larin | A47C 9/06 114/188 |
| 2,583,372 | A | * | 1/1952 | Hall | A47C 9/06 297/14 |
| 4,913,487 | A | * | 4/1990 | Breckel | A47C 9/06 297/14 |
| 5,429,414 | A | * | 7/1995 | Olsson | B60N 2/3084 297/14 |
| 6,371,896 | B1 | * | 4/2002 | Kettler | A63B 21/078 297/13 |
| 6,896,322 | B1 | * | 5/2005 | Foy | A47C 1/126 297/129 |
| 6,932,427 | B2 | * | 8/2005 | Tamura | A45C 15/00 190/12 A |
| 7,559,594 | B2 | * | 7/2009 | McMillen | B60N 2/206 296/65.09 |
| 7,611,200 | B2 | * | 11/2009 | Jovicevic | B60N 2/2209 297/14 |

* cited by examiner

*Primary Examiner* — Philip Gabler
(74) *Attorney, Agent, or Firm* — Snell & Wilmer L.L.P.

(57) ABSTRACT

A stowable seat is provided. The stowable seat may comprise a housing, a back rest coupled to the housing at a top of the back rest, and a seat bottom coupled to a bottom of the back rest. A track may be coupled to a housing with the seat bottom configured to slide along the track. A linkage may be coupled between the housing and the track and configured to translate the track away from the housing.

14 Claims, 5 Drawing Sheets

STOWABLE RECLINING SEAT WITH LATERAL TRANSLATION LINKAGE

FIELD OF INVENTION

The present disclosure relates to stowable seat, and, more specifically, to a stowable seat with a linkage for lateral translation.

BACKGROUND

Aircraft cabin seats are used for flight attendant safety and comfort during taxi, takeoff, landing, and inflight rest periods. Useable volumetric space on an aircraft may be limited for large, well-appointed seats. Additionally, seats should not hinder ingress and egress for passengers in the event of an emergency. Aircraft cabin seats may be used for long periods of time and longer duration flights. An uncomfortable cabin seat may cause pain and/or discomfort for the crew on an aircraft.

SUMMARY

A seat may comprise a housing, a linkage pivotally coupled to the housing, a back rest coupled to the housing, and a seat bottom coupled to the linkage and a base of the back rest. The linkage may be configured to translate the seat bottom and the base of the back rest laterally relative to the housing.

In various embodiments, a footrest may be pivotably coupled to the seat bottom, and a leg may be pivotably coupled to the footrest. The leg may be configured to support the footrest in a deployed position. The back rest may be at a 30° angle relative to vertical in response to the linkage being in a stowed position. The back rest may have an angle of at least 40° from vertical in response to the linkage being in a deployed position. The seat bottom and back rest may be configured to stow at least partially in the housing. The seat bottom may extend from the base of the seat back at an angle of at least 5° from horizontal in response to the linkage being in a deployed position. A latch may be coupled to the housing, and a lever may be coupled to the latch and configured to release the linkage in response to an actuation of the lever. An opening may be defined by the housing, and a tray table may be configured to stow in the opening. An arm rest may be coupled to the housing and the tray table may be removably coupled to the arm rest. A stow box may be disposed in the housing and beneath the seat bottom. The seat bottom and the base of the seat back may be slideably coupled to a track. A lever may be configured to translate the seat along the track in response to the lever being pulled.

A stowable seat may comprise a housing, a back rest coupled to the housing at a top of the back rest, and a seat bottom coupled to a bottom of the back rest. A track may be coupled to a housing with the seat bottom configured to slide along the track. A linkage may be coupled between the housing and the track and configured to translate the track away from the housing.

In various embodiments, a footrest may be pivotably coupled to the seat bottom, and a leg may be pivotably coupled to the footrest. The leg may be configured to support the footrest in a deployed position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
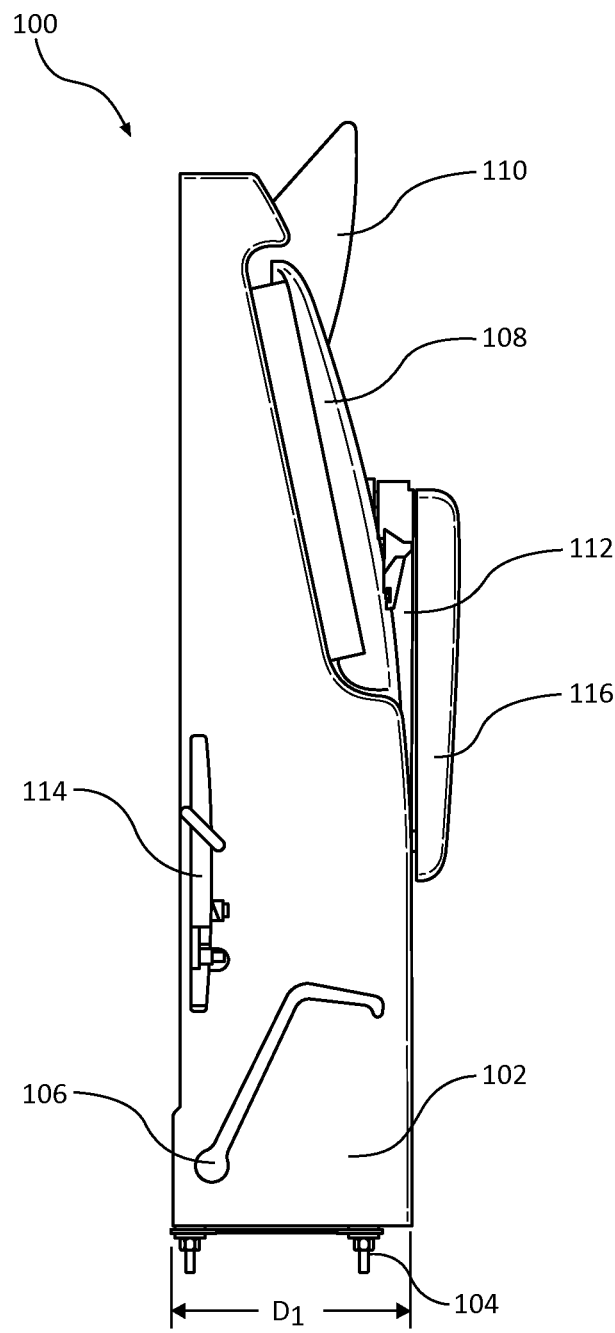
FIG. 1 illustrates a side view of a stowable seat in a stowed position, in accordance with various embodiments.
Figure 2:
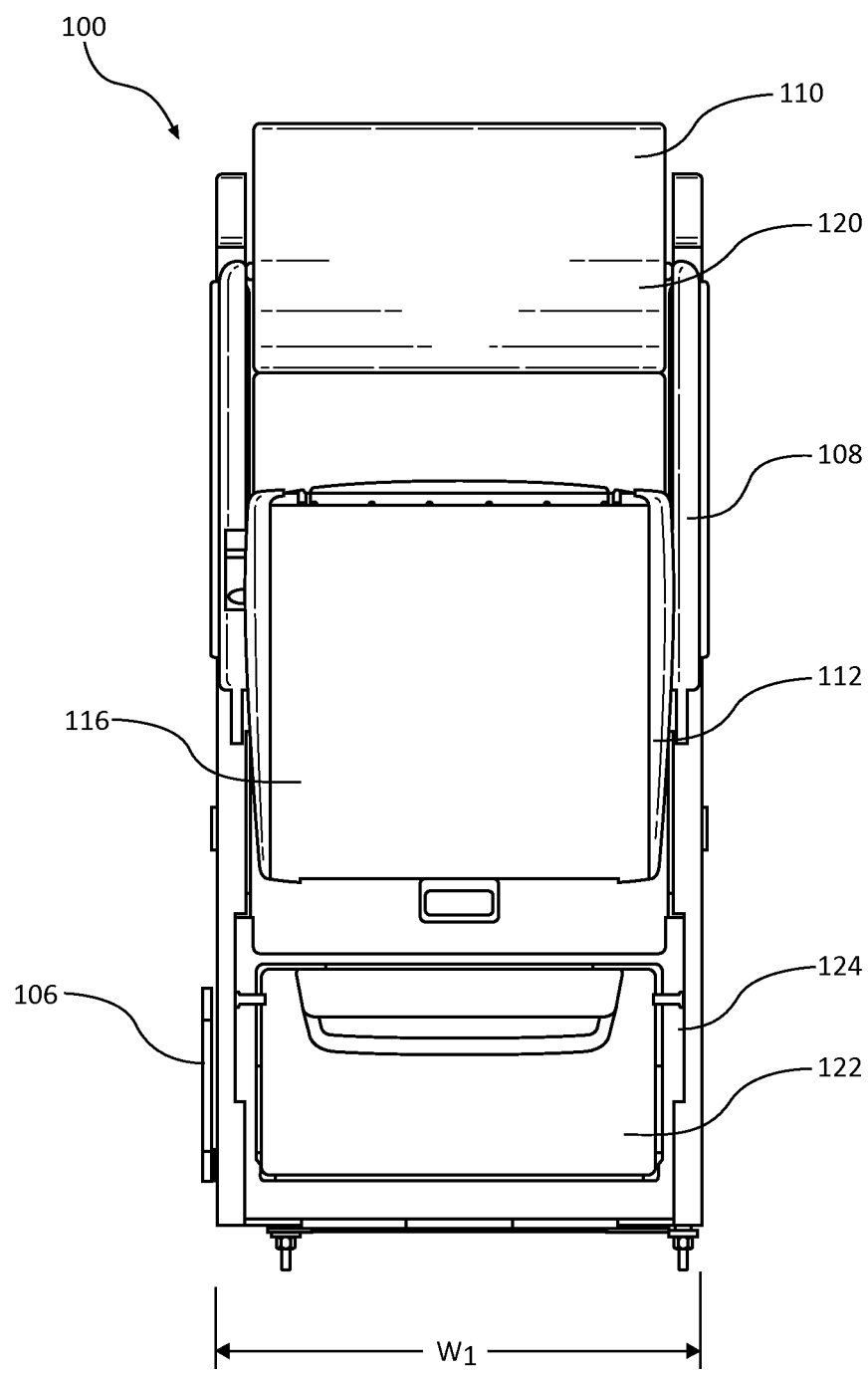
FIG. 2 illustrates a front view of a stowable seat in a stowed position, in accordance with various embodiments.

With reference to FIGS. 1 and 2, a stowable seat 100 is shown in a stowed position with back rest 110 and seat bottom 112 partially stored within housing 102. Housing 102 provides structural support and defines the depth D1 of the envelope of stowable seat 100 in a stowed position. Depth D1 may be less than 1 foot (30.5 cm). For example, the depth D1 of stowable seat 100 in a stowed position may be 11.5 inches (29.2 cm) at the base of housing 102. Feet 104 may protrude downward from housing 102 of stowable seat 100 and provide a mounting point to mount stowable seat 100 to an aircraft floor, for example. Lever 106 may release a linkage stowed within housing 102 to translate portions of stowable seat 100 laterally away from housing 102.

In various embodiments, arm rests 108 may by pivotably coupled to housing 102 such that arm rests 108 may pivot towards housing 102 into a stowed position. As illustrated, housing 102 may include a recessed surface to receive arm rests 108. Seat back 110 may protrude vertically from housing 102 when stowable seat 100 is configured in a stowed position. Seat bottom 112 may fold upward and towards seat back 110 so that seat bottom 112 is disposed at least partially in housing 102. Tray table 114 may store in a recess in housing 102. Tray table 114 may be removed from housing 102 and removably coupled to arm rests 108 to provide a working surface for an occupant of stowable seat 100. A retractable footrest 116 may pivotably couple to seat bottom 112 and fold against seat bottom 112 in response to stowable seat 100 being configured in a stowed position.

In various embodiments, seat back 110 may include a cushion 120 facing outward from housing 102. The top side of footrest 116 may also face away from housing 102. A door 122 may open into a stow compartment 124. Width W1 may define a width of the envelope of stowable seat 100 configured in a stowed position. Width W1 may be approximately 20 inches (50.8 cm), for example. Stowable seat 100 in the stowed position may occupy less space than stowable seat 100 in a deployed position. In that regard, stowable seat 100 may be stowed to conserve useable volume in an aircraft or other application where space is limited.

Figure 3:
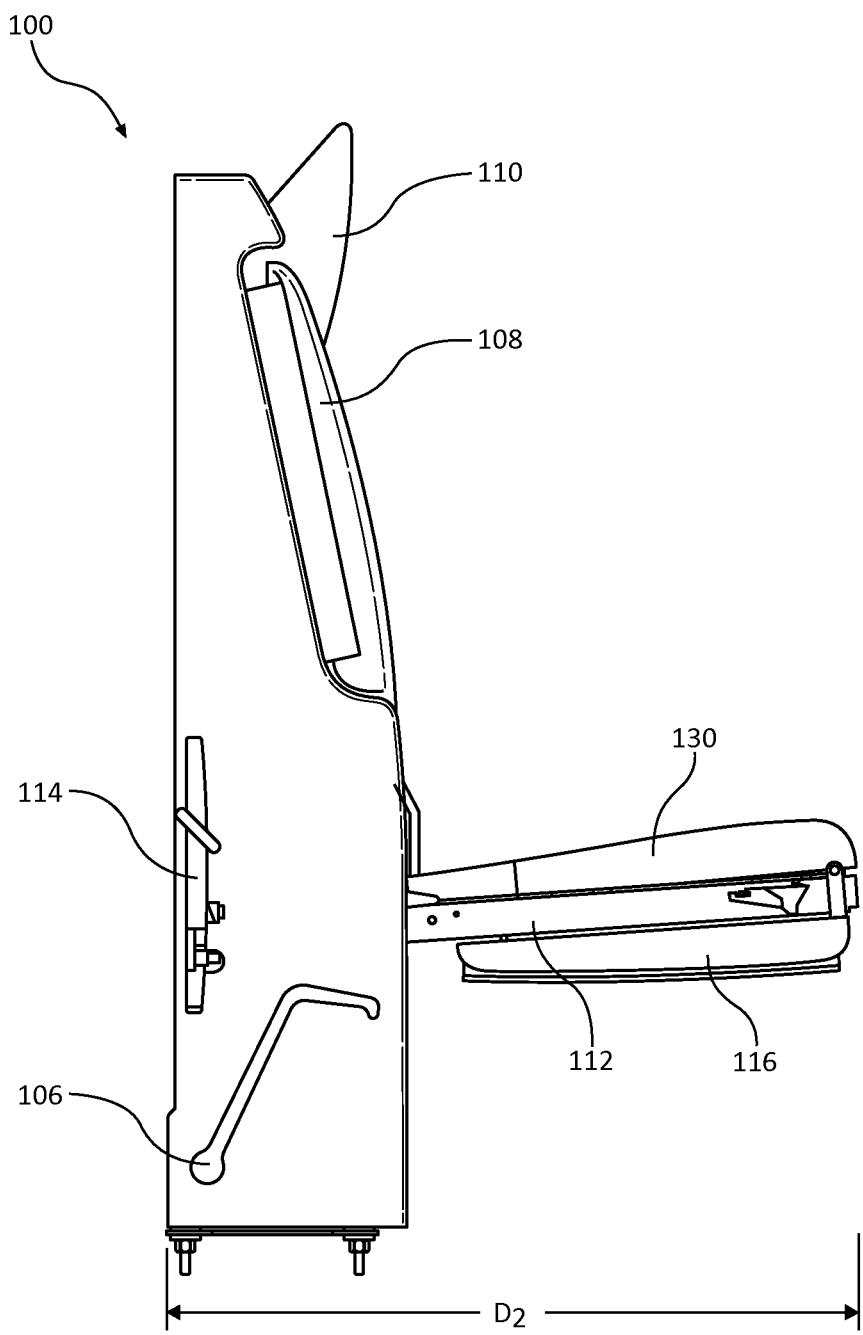
FIG. 3 illustrates a side vide of a stowable seat in a partially deployed position with a translating linkage stowed, in accordance with various embodiments.

With reference to FIG. 3, a side vide of a stowable seat 100 is shown in a partially deployed position with a translating linkage stowed within housing 102, in accordance with various embodiments. Seat bottom 112 may be pivotably coupled to housing 102 such that seat bottom 112 may fold away from housing 102. Cushion 130 of seat bottom 112 may be oriented to face upward (i.e., in a direction away from feet 104) in the partially deployed position. Lever 106 and tray table 114 may remain in the stowed positions as stowable seat 100 moves into the partially deployed position. In the partially stowed position, seat bottom 112 may slide laterally outward from housing 102 along a track (discussed in further detail below). Seat back 110 and arm rest 108 may also remain in the stowed position, however seat back 110 may also translate laterally as seat bottom 112 slides along a track until seat back is oriented up to 30° from vertical. Stowable seat 100 in a partially deployed position may have a depth D2 of 27.8 inches (70.6 cm). Footrest 116 may face downward while the footrest 116 is stowed and stowable seat 100 is in the partially deployed position.

Figure 4:
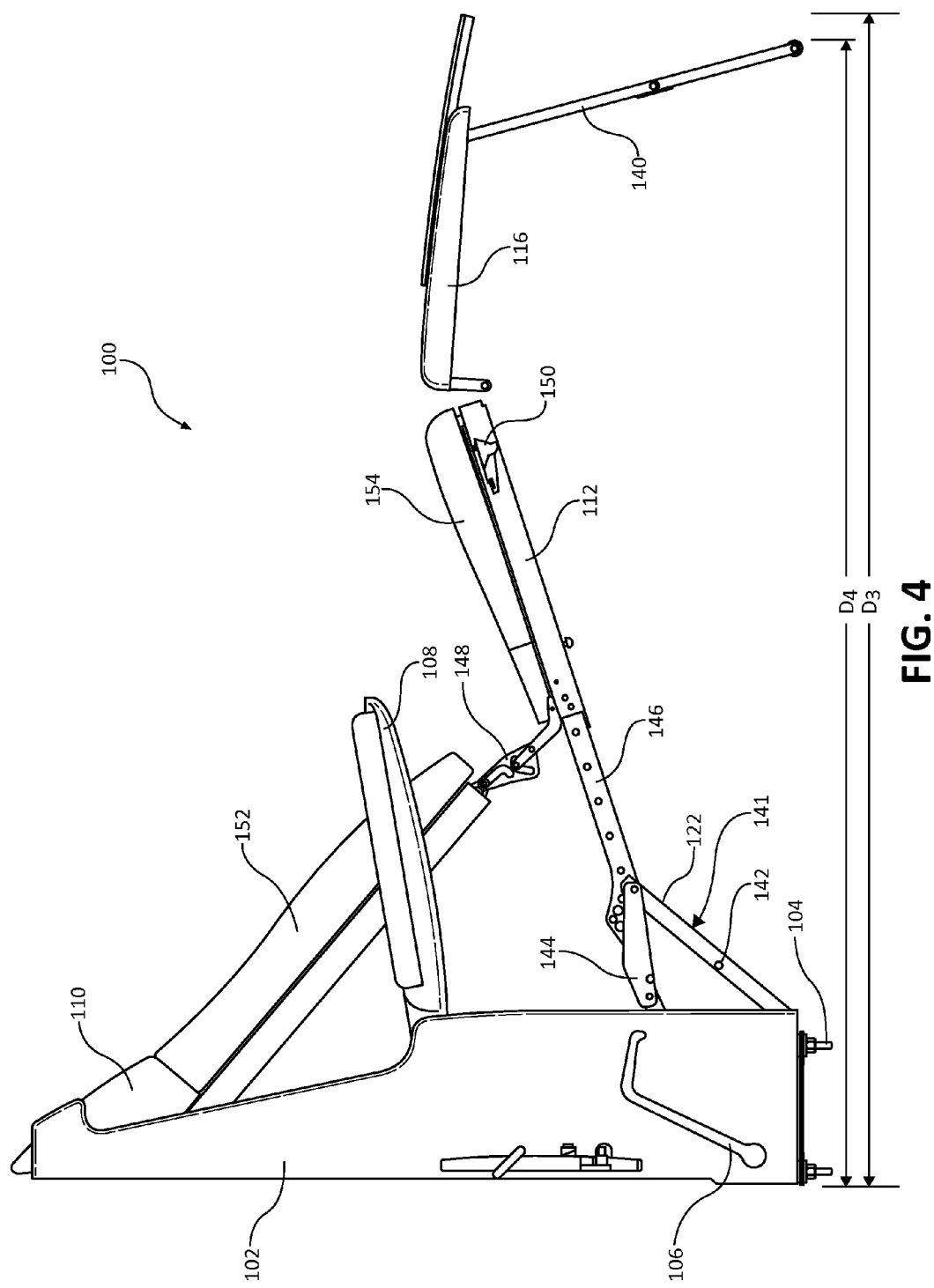
FIG. 4 illustrates a side view of a stowable seat in a fully deployed position with a translating linkage deployed and a retractable footrest and support arm deployed, in accordance with various embodiments.
Figure 5:
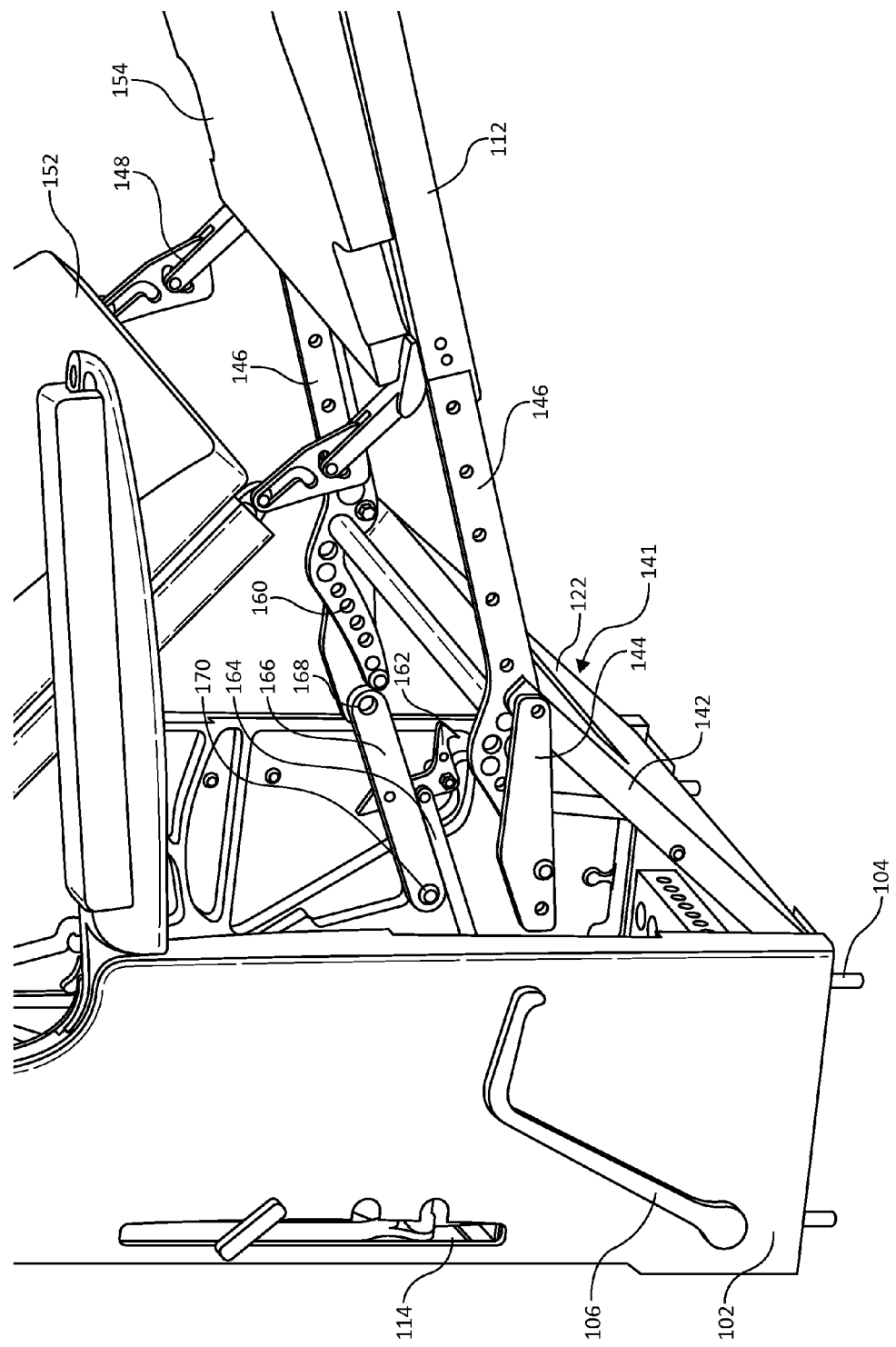
FIG. 5 illustrates a perspective view of a linkage coupled to a seat bottom and seat back of a stowable seat to translate the stowable seat laterally, in accordance with various embodiments.

With reference to FIGS. 4 and 5, a stowable seat 100 is shown in a fully deployed position with a translating linkage 141 deployed from housing and footrest 116 and support arm 140 deployed, in accordance with various embodiments. Translating linkage 141 may be coupled to a seat bottom and seat back of a stowable seat to translate the stowable seat laterally. Stowable seat 100 may be deployed by actuating lever 106 by rotation about a pivot point to release upper arm 144 and lower arm 142 of translating linkage 141 from housing 102. Upper arm 144 may be longer than lower arm 142 so that translating linkage 141 forms a triangle with housing 102 as viewed from the side. Upper arm 144 and lower arm 142 are coupled to track 146. Seat bottom 112 may slide along track 146 when seat bottom lever 150 is actuated to release seat bottom 112. Door 122 may be coupled to lower arm 142 of translating linkage 141 such that door 122 tilts out of housing 102 in response to translating linkage 142 being deployed. Seat back 110 is pivotably coupled to seat bottom 112 by linkage 148. Linkage 148 may also contain slots or another mechanism to telescope and allow the distance between seat bottom 112 and seat back 110 to vary.

In various embodiments, footrest 116 may be deployed by pivoting footrest 116 approximately 180° about an end of seat bottom 112. Support arm 140 may fold down from footrest 116 to provide load bearing support for footrest 116 and reduce the leverage that translating linkage 141 is subjected to when the chair is loaded. Folding arm 140 may extend distance D4 from the back of housing 102. An end of footrest 116 may mark the widest point of the envelope of stowable seat 100 in a deployed position at a distance D3 from the back of housing 102.

In various embodiments, track 146 may be coupled to upper arm 144 by pivoting linkage 160. Upper arm 144 may be coupled to release arm 166 at pivot 168. Mount 170 may couple release arm 166 to housing 102. In response to actuation of lever 106, release mechanism 164 may translate to actuate latch 162 and thereby release the release arm 166. Upper arm 144 and lower arm 142 have uneven lengths and may deploy and shift track 146, seat back 110, and seat bottom 112 laterally from housing 102. Seat back 110 may reach an angle greater than 40° from vertical. For example, seat back 110 may be oriented at 45° from vertical in a fully deployed position. Seat bottom 112 may be oriented at an angle from 3° to 15° (e.g., an angle of 5°) above horizontal to retain an occupant on seat bottom 112.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat, comprising:
   a housing;
   a linkage pivotably coupled to the housing and comprising an upper arm and a lower arm;
   a back rest coupled to the housing;
   a track pivotally coupled to the upper arm of the linkage and pivotally coupled to the lower arm of the linkage; and
   a seat bottom slideably coupled to the track, wherein the linkage translates the track, the seat bottom, and the base of the back rest laterally relative to the housing.

2. The seat of claim 1, further comprising:
   a footrest pivotably coupled to the seat bottom; and
   a leg pivotably coupled to the footrest, wherein the leg is configured to support the footrest in a deployed position.

3. The seat of claim 1, wherein the back rest comprises a 30° angle relative to vertical in response to the linkage being in a stowed position.

4. The seat of claim 1, wherein the back rest comprises an angle of at least 40° from vertical in response to the linkage being in a deployed position.

5. The seat of claim 1, wherein the seat bottom and back rest are configured to stow at least partially in the housing.

6. The seat of claim 1, wherein the seat bottom extends from the base of the seat back at an angle of at least 5° from horizontal in response to the linkage being in a deployed position.

7. The seat of claim 1, further comprising:
   a latch coupled to the housing; and
   a lever coupled to the latch, wherein the latch is configured to release the linkage in response to an actuation of the lever.

8. The seat of claim 1, further comprising:
   an opening defined by the housing; and
   a tray table configured to stow in the opening.

9. The seat of claim 8, further comprising an arm rest coupled to the housing, wherein the tray table is configured to removably couple to the arm rest.

10. The seat of claim 1, further comprising a stow compartment disposed in the housing and beneath the seat bottom.

11. The seat of claim 1, further comprising a lever configured to allow the seat to translate along the track in response to the lever being pulled.

12. A stowable seat, comprising:
    a housing;
    a back rest coupled to the housing at a top of the back rest;
    a seat bottom coupled to a bottom of the back rest;
    a track coupled to the housing, wherein the seat bottom is configured to slide along the track; and
    a linkage coupled between the housing and the track, wherein the linkage comprises an upper arm pivotally coupled to the track and a lower arm pivotally coupled to the track, wherein the linkage is configured to translate the track, the seat bottom, and a bottom of the back rest away from the housing.

13. The stowable seat of claim 12, further comprising:
    a footrest pivotably coupled to the seat bottom; and
    a leg pivotably coupled to the footrest, wherein the leg is configured to support the footrest in a deployed position.

14. The stowable seat of claim 12, wherein the back rest comprises an angle of at least 40° from vertical in response to the linkage being in a deployed position.

* * * * *